United States Patent [19]

Hergenrother

[11] Patent Number: 5,194,499

[45] Date of Patent: Mar. 16, 1993

[54] POLYMERIZING DIENE BLOCK COPOLYMER IN PRESENCE OF RUBBER

[75] Inventor: William L. Hergenrother, Akron, Ohio

[73] Assignee: Bridgestone/Firestone, Inc., Akron, Ohio

[21] Appl. No.: 551,547

[22] Filed: Jul. 11, 1990

Related U.S. Application Data

[63] Continuation-in-part of Ser. No. 242,028, Sep. 8, 1988, abandoned, which is a continuation-in-part of Ser. No. 36,768, Apr. 3, 1987, abandoned, which is a continuation-in-part of Ser. No. 766,329, Aug. 16, 1985, abandoned, which is a continuation-in-part of Ser. No. 527,055, Aug. 29, 1983, abandoned.

[51] Int. Cl.$^5$ ...................... C08L 53/00; C08L 53/02
[52] U.S. Cl. ........................................ 525/91; 525/90; 524/426; 524/505
[58] Field of Search ................. 525/91, 145, 123, 179, 525/189, 236, 90; 524/426, 505

[56] References Cited

U.S. PATENT DOCUMENTS

| | | | |
|---|---|---|---|
| 3,853,796 | 12/1974 | Oldack et al. ......................... | 525/90 |
| 3,930,107 | 12/1975 | Yaeda et al. ......................... | 428/407 |
| 4,029,862 | 6/1977 | Liu et al. ............................... | 526/43 |
| 4,070,344 | 1/1978 | Hergenrother et al. ............ | 260/77.5 |
| 4,431,765 | 2/1984 | Doshak et al. ....................... | 524/426 |

FOREIGN PATENT DOCUMENTS

| | | |
|---|---|---|
| 56-24146 | 3/1981 | Japan . |
| 0729066 | 4/1980 | U.S.S.R. .............................. 525/236 |

OTHER PUBLICATIONS

Kirk-Othmer, *Encycopedia of Chemical Technology*, vol. 19, 2nd Edition, 1969, p. 613.
Kirk-Othmer, *Encyclopedia of Chemical Technology*, vol. 22, 3rd Edition, John Wiley and Sons, New York, N.Y., 1982, p. 1007.

*Primary Examiner*—Robert E. Sellers
*Attorney, Agent, or Firm*—Frank J. Troy, Sr.

[57] ABSTRACT

A process for preparing free flowing pellets of thermosetting resin. The process includes the steps of polymerizing in the presence of a polymerization solvent the A forming component of a peroxide curable, tacky, cold flowing block copolymer AB, to form an active block; end capping the active block with a polyisocyanate compound; forming a solution of a non-cold flowing rubber; charging the solution simultaneously with the addition of the B forming component of the block copolymer AB with heat to form a thermosetting resin; removing the polymerization solvent; forming pellets of the resin, free from cold flow; subjecting the pellets to a surface treatment whereby a coating is provided to remove tack; and thereafter separating the pellets to yield a free flowing thermosetting resin comprising from about 55 to 95 parts by weight of the tacky, cold flowing block copolymer and from about 5 to 45 parts by weight of the non-cold flowing rubber and which upon cure has a flexural modulus of from about 1.7 GPa to about 4.4 GPa. A similar process includes the step of adding a filler material prior to pelletization and produces free flowing thermosetting resin which upon cure has a flexural modulus of from about 3 GPa to about 10 GPa. Processes are also provided for preparing free flowing pellets of thermosetting resin based upon low molecular weight, high vinyl content conjugated diene homopolymers as the tacky, cold flowing polymer.

12 Claims, No Drawings

POLYMERIZING DIENE BLOCK COPOLYMER IN PRESENCE OF RUBBER

CROSS-REFERENCE TO RELATED APPLICATIONS

This application is a continuation-in-part of U.S. Ser. No. 242,028 filed Sep. 8, 1988 (now abandoned) which is, in turn, a continuation-in-part of U.S. Ser. No. 036,768 filed Apr. 3, 1987 (now abandoned) which is, in turn, a continuation-in-part of U.S. Ser. No. 766,329 filed Aug. 16, 1985 (now abandoned) which is, in turn, a continuation-in-part of U.S. Ser. No. 527,055 filed Aug. 29, 1983 (now abandoned).

TECHNICAL FIELD

The present invention is directed toward a process for preparing free flowing polymer pellets of thermosetting resins. A number of thermosetting resin polymers and copolymers are known that are tacky or sticky at room temperature and which may also exhibit creep or cold flow. The latter is a characteristic of a resin or substance which deforms under its own weight, coalescing into an amorphous mass. Creep is defined by C. Harper, *Handbook of Plastics and Elastomers*, Glossary of Terms p. 4 (1975) as follows: "The dimensional change with time of a material under load, following the initial instantaneous elastic deformation; the time-dependent part of strain resulting from force. Creep at room temperature is sometimes called 'cold flow'."

Several polymers that are of this type include certain high vinyl polybutadienes and block copolymers of conjugated dienes and nylon. While these compounds have useful physical properties as thermosetting resins, they cannot be readily molded with compression or injection apparatus. Such apparatus is normally fed with pellets of the material which are deposited into a feed hopper. Pellets of these materials have a high tendency to stick to one another as well as surrounding surfaces thereby greatly inhibiting their transfer into the apparatus. Also, because they exhibit cold flow, the pellets tend to agglomerate and coalesce upon storage.

BACKGROUND ART

Previous attempts to eliminate tack and cold flow from polymers have included the use of various filler materials such as silica, carbon black, mica, and a variety of fibers. While such treatment can provide sufficient integrity to cold flow materials for them to hold a shape, it does little to eliminate surface tack. Moreover, high filler loadings can extend to several times the weight of the polymer thereby restricting the usage of the polymer to applications where the filler can be tolerated.

In order to provide tack-free surfaces, surface treatment of polymers is also possible. U.S. Pat. No. 4,029,862 is directed toward a process of chlorinating solid linear polyethylene in order to impart improved handling characteristics such as non-agglomeration. The process is not directly applicable to sticky, cold-flowable polymers, however, inasmuch as the polymer particles treated according to the patent had a free-flowing nature, suitable for extrusion operations, prior to the treatment.

U.S. Pat. No. 4,431,765, owned by the Assignee of record, discloses a process for forming free flowing particles of polybutadiene thermoset resins by adding certain filler materials in an amount sufficient to render the resin free flowing and resistant to cold flow. The process calls for the two components to be mixed together to form a blend which is thereafter chopped into small particles.

Russian Pat. No. 729,066 teaches the preparation of free-flowing rubber crumb from latex by treatment of the latex with a hypochlorite solution.

Finally, U.S. Pat. No. 3,853,796, also owned by the Assignee of record, discloses high stress-low elongation polymer compositions comprising a copolymer of nylon and a conjugated diene, blended with reinforcing fibers and optionally with a rubber polymer. The patent does not address cold flow or tack free compositions and differs from the present invention in that the rubber added is added after the copolymer has been formed.

Thus, the art disclosed herein has not provided a process for eliminating both undesirable surface tack and cold flow from polymers and copolymers that exhibit these properties.

DISCLOSURE OF THE INVENTION

In general the subject invention is directed toward a process for preparing free flowing pellets of thermosetting resins which includes the steps of polymerizing in the presence of a polymerization solvent the A forming component of a peroxide curable, tacky, cold flowing block copolymer AB, selected from the group consisting of conjugated dienes and mixtures thereof with monomers selected from the group consisting of vinyl substituted aromatic monomers, aliphatic, aromatic and cycloaliphatic oxide and sulfide monomers, to form an active block; end capping the active block with a polyisocyanate compound; forming a solution of a non-cold flowing rubber selected from the group consisting of ethylene-propylene-hexadiene copolymers, natural rubber, styrene-butadiene rubber, butyl rubber, branched high molecular weight high vinyl butadiene rubber, polynorbornene, polypentamer and thermoplastic elastomers of styrene and conjugated dienes; charging the solution simultaneously with the addition of the B component of the block copolymer AB with heat to form a thermosetting resin, said B component being selected from the group consisting of polyamides, polyimides, polyureas, polyurethanes, polyureaurethanes and polyphenolformaldehydes; removing the polymerization solvent; forming pellets of the resin, free from cold flow; subjecting the pellets to a surface treatment whereby a coating is provided to remove tack; and thereafter separating the pellets to yield a free flowing thermosetting resin comprising from about 55 to 95 parts by weight of the tacky, cold flowing block copolymer and from about 5 to 45 parts by weight of the non-cold flowing rubber and which upon cure has a flexural modulus of from about 1.7 GPa to about 4.4 GPa.

The subject invention is also directed toward a process for preparing free flowing pellets of thermosetting resins which includes the steps of polymerizing in the presence of a polymerization solvent the A forming component of a peroxide curable, tacky, cold flowing block copolymer AB, selected from the group consisting of conjugated dienes and mixtures thereof with monomers selected from the group consisting of vinyl substituted aromatic monomers, aliphatic, aromatic and cycloaliphatic oxide and sulfide monomers, to form an active block; end capping the active block with a polyisocyanate compound; forming a solution of a non-cold flowing rubber selected from the group consisting of ethylene-propylene-hexadiene copolymers, natural rubber, styrene-butadiene rubber, butyl rubber, branched high molecular weight high vinyl butadiene rubber, polynorbornene, polypentamer and thermoplastic elastomers of styrene and conjugated dienes; charging the solution simultaneously with the addition of the B component of the block copolymer AB with heat to form a thermosetting resin, said B component being selected from the group consisting of polyamides, polyimides, polyureas, polyurethanes, polyureaurethanes and polyphenolformaldehydes; removing the polymerization solvent; adding suitable fillers to the resin in an amount of from about five to about 350 parts per 100 parts of the resin; forming pellets of the resin, free from cold flow; subjecting the pellets to a surface treatment whereby a coating is provided to remove tack; and thereafter separating the pellets to yield a free flowing thermosetting resin comprising from about 55 to 95 parts by weight of the tacky, cold flowing block copolymer and from about 5 to 45 parts by weight of the non-cold flowing rubber and which upon cure has a flexural modulus of from about 3 GPa to about 10 GPa.

The subject invention is also directed toward a process for preparing free flowing pellets of thermosetting resins which includes the steps of forming a solution of a non-cold flowing rubber selected from the group consisting of ethylene-propylene-hexadiene copolymers, natural rubber, styrene-butadiene rubber, butyl rubber, branched high molecular weight high vinyl butadiene rubber, polynorbornene, polypentamer and thermoplastic elastomers of styrene and conjugated dienes; polymerizing in the presence of a polymerization solvent and said solution a tacky, cold flowing, low molecular weight, high vinyl content conjugated diene homopolymer; removing the polymerization solvent; forming pellets of the resin, free from cold flow; subjecting the pellets to a surface treatment whereby a coating is provided to remove tack; and thereafter separating the pellets to yield a free flowing thermosetting resin comprising from about 55 to 95 parts by weight of the tacky, cold flowing block copolymer and from about 5 to 45 parts by weight of the non-cold flowing rubber and which upon cure has a flexural modulus of from about 1.7 GPa to about 4.4 GPa.

The subject invention is also directed toward a process for preparing free flowing pellets of thermosetting resins which includes the steps of forming a solution of non-cold flowing rubber selected from the group consisting of ethylene-propylene-hexadiene copolymers, natural rubber, styrene-butadiene rubber, butyl rubber, branched high molecular weight high vinyl butadiene rubber, polynorbornene, polynorbornene, polypentamer and thermoplastic elastomers of styrene and conjugated dienes; polymerizing in the presence of a polymerization solvent and said solution a tacky, cold flowing, low molecular weight, high vinyl content, conjugated diene homopolymer; removing the polymerization solvent; adding suitable fillers to the resin in an amount of from about five to about 350 parts per 100 parts of the resin; forming pellets of the resin, free from cold flow; subjecting the pellets to a surface treatment whereby a coating is provided to remove tack; and thereafter separating the pellets to yield a free flowing thermosetting resin comprising from about 55 to 95 parts by weight of the tacky, cold flowing block copolymer and from about 5 to 45 parts by weight of the non-cold flowing rubber and which upon cure has a flexural modulus of from about 3 GPa to about 10 GPa.

One particularly interesting cold flowing resin is a block copolymer of 1,2-polybutadiene and nylon-6, described in detail hereinbelow. These copolymers are known and have useful physical properties but they are soft and putty-like at room temperatures making them unfit for use in the feed hoppers of injection molding apparatus. In addition to imparting free-flow to pellets of such block copolymers, the process of the present invention also permits higher solids content of the block copolymer to be obtained without loss of suspension during preparation of the copolymer which loss deleteriously affects conversion.

The products produced by the process of the present invention exhibit free flow in small particles and comprise from about 55 to 95 parts of a tacky, cold flowing polymer and from about 5 to 45 parts of a non-cold flowing rubber wherein tack contributed by the cold flowing polymer is removed at the surface of the particles. Removal of the tack and the step of surface treatment in the foregoing method can be provided by immersing the pellets in an aqueous solution containing at least one member selected from the group consisting of $Br_2$, $Cl_2$, NaOCl, KOCl, $Ca(OCl)_2$, $KMnO_4$, $K_2Cr_2O_7$, $H_2O_2$ and $OsO_4$. Hydrochloric acid can also be added to the aqueous solution where one of the foregoing components other than $Br_2$, $Cl_2$, $H_2O_2$ and $OsO_4$ is present. This treatment provides a halogen, oxygen or hydroxyl group on the surface of said pellets. Alternatively, the surface treatment can be practiced by coating the surface of the pellets with a powdered filler material such as talc, silica, mica, polyethylene or the like.

PREFERRED MODE FOR CARRYING OUT THE INVENTION

Throughout this specification terms such as "tack", "free flowing", "cold flowing" and "non-cold flowing" are used in the following context. "Tack" is defined as that property which causes two materials to resist separation after their surfaces have been brought into contact for a short time under light pressure. "Free flowing" is defined as the ability of materials, stored in intimate contact, to resist coalescing and, therefore, remain pourable and separate from each other. "Cold flowing" is synonymous with creep and is defined as that property where polymers or copolymers, under normal ambient conditions, are amorphous and flow readily due to gravitational forces. "Non-cold flowing" is defined as the property of a polymer or copolymer to retain its shape under ambient conditions.

Typical examples of cold flowing, tacky thermosetting resin polymers include low molecular weight, high vinyl content homopolymers of conjugated dienes and the block copolymers of butadiene and caprolactam. The former polymers are linear and exhibit considerable cold flow. Preparation and properties thereof are described in U.S. Pat. No. 3,835,075, owned by the Assignee of record, the subject matter of which is incorporated herein by reference. The latter polymers have many properties characteristic of the nylons, however, unlike the nylons, the polymers can be molded at temperatures below the melt temperature of the corresponding nylon and they can be milled at ambient temperatures. They possess upon cure good impact, good abrasion resistance, toughness and low coefficients of friction. Either 1,2-butadiene or 1,4-butadiene can be employed in the block copolymer to give copolymers moldable as plastics or rubbers, depending on the degree of cure. A particularly useful polymer is the block copolymer of 1,2-butadiene and nylon-6, designated by Firestone as Maran resin. It has a number average molecular weight of about 15,000 g/mole and a nylon content of 67 percent by weight.

The preparation of these thermoset polymers is described in U.S. Pat. Nos. 3,838,108 and 3,859,382, commonly owned by the Assignee of record. Other thermoset polymers set forth in the subject patents include cold flowing block copolymers AB, wherein the A forming component is selected from the group consisting of conjugated dienes, and mixtures of conjugated dienes with monomers selected from the group consisting of vinyl substituted aromatic monomers such as styrene, aliphatic, aromatic and cycloaliphatic oxide and sulfide monomers and, wherein the B component is selected from the group consisting of polyamides, polyimides, polyureas, polyurethanes, polyureaurethanes and polyphenolformaldehydes.

The foregoing monomers and block copolymers formed therefrom are thoroughly set forth in the aforementioned U.S. Pat. Nos. 3,838,108 and 3,859,382, the subject matter of which is hereby incorporated by reference. Inasmuch as the polymers are known as is the process for their preparation, the novelty of the present invention is not directed thereto. Reference to the subject patents can be made by those skilled in the art for the useful block copolymers that exhibit cold flow and are tacky. As such, it has been difficult to employ such polymers in conventional processing equipment where the desired resin is placed in a hopper, in pellet or granular form, to be fed into the apparatus.

The subject invention is not intended to be limited to the polymers recited in these patents inasmuch as it is believed that the subject invention is applicable to any thermoset polymer having cold flow and which is tacky. Polymers included in this group may also be peroxide curable, that is, have carbon-carbon double bonds. Although peroxides are not a part of the present invention, it is believed that the double bonds are chemically reacted with the components of the aqueous solution and therefore peroxide curable can be another characteristic to describe the polymers that can be made into free flowing particles according to the process of the present invention. For ease of discussion, all of these polymers shall generally be referred to in the specification as cold flowing polymers. The preferred polymer treated according to the process of the present invention is the aforementioned Maran resin, a block copolymer of 1,2-butadiene and nylon-6 which is exemplified hereinbelow.

The first step of the process of the present invention involves the preparation of one of the block components A of the cold flowing polymer AB. A detailed description of the cold flowing polymer has been set forth in the aforementioned patents of the Assignee of record and shall only be briefly summarized herein, it being understood that the present invention shall not be limited to the summary. For the preparation of a block copolymer of 1,2-butadiene and nylon-6, hereinafter Maran, 1,3-butadiene is first charged to a suitable reaction vessel in a solvent, e.g., aliphatic hydrocarbon, cycloaliphatic hydrocarbon, aromatic compound or the like with tetrahydrofuran, dimethyl ether, toluene, hexane, benzene and the like being preferred. Active hydrogens must be excluded so as not to terminate the polymer chain. Polymerization by suspension is conducted anionically with an organolithium compound RLi such as n-butyl lithium, where R is an aliphatic, although cycloaliphatic and aromatic radicals can be substituted.

The amount of initiator selected depends upon the monomer being employed and the desired molecular weight of the polymer, e.g., 3,000 to 100,000. In order to favor a high 1,2 structure, a modifier such as N,N,N',N',-tetramethylene diamine (TMEDA) is added before polymerization is commenced. Following polymerization of the monomer, butadiene, to form a polybutyldienyl lithium solution, the polymer chain is end capped with a polyisocyanate compound such as toluene diisocyanate (TDI) or a polyisothiocyanate which is added to produce an isocyanate or isothiocyanate end capped polymer having at least one unreacted isocyanate or isothiocyanate group. Polymerization of the other block component B is customarily conducted at this stage by the addition of the second monomer such as a lactam of an internal amide, e.g., caprolactam for the formation of Maran. Of course, other monomers could be substituted to form urea, urethane, imide blocks and the like. For the production of Maran, a small amount of phenyl beta naphthylamine (PBNA), an antioxidant can also be added in a compatible solvent such as toluene.

The present invention differs from the known process for preparing such cold flowing polymers in that a solution of a non-cold flowing rubber is concurrently added with the monomers introduced to form the B polymer component. Such solutions are dry, containing less than 50 parts per million of water, and can be prepared in one of the aforementioned solvents utilized for the preparation of the A block component.

The preferred polymers include rubbers such as ethylene-propylene-diene terpolymer; Nordel, a registered trademark of E. I. duPont de Nemours and Co. for ethylenepropylene-hexadiene terpolymer; natural rubber; styrene butadiene rubber; butyl rubber; branched high molecular weight, high vinyl butadiene rubber; Norsorex, a polynorbornene available from American Cyanamid; polypentamer; the thermoplastic elastomers of styrene and conjugated dienes such as Kraton, a styrene-butadiene-styrene block copolymer and the like. Kraton is a registered trademark of Shell Chemical Co. For ease of discussion, these polymers are referred to as non-cold flowing polymers herein.

One particularly useful polymer in this group is the branched, high molecular weight, high vinyl 1,2-polybutadiene. In the uncured state, it is a rubber, as is the linear, 1,2-polybutadiene material discussed hereinabove, but differs primarily by the fact that it is non-cold flowing, while the former is a cold flowing material. It can be prepared by the anionic polymerization of 1,3-butadiene in the presence of an organolithium initiator modified with bis-heterocyclic ethane compounds such as bis-morpholino ethane (DME), bis-piperidino ethane (DPE), bis-pyrrolidino ethane (DPEE), and bis-N-methyl piperazino ethane (DNMPE). The polymer obtained by this process contains as much as 100 percent vinyl polybutadiene and randomly distributed syndio and isotactic units. In general, a bis-piperidino ethane modified n-butyllithium initiator can be readily employed. Termination with dry caprolactam is preferable to provide a stable, storable solution that will be compatible with the anionic nylon polymerization involved in the last step of the Maran resin or other cold flowing polymer preparation.

It is to be noted that styrene butadiene rubber is not identical to the thermoplastic elastomers of styrene and conjugated dienes such as butadiene and should not be confused therewith. The former is a synthetic rubber commonly referred to as SBR. It is the most common type of synthetic rubber and is prepared by the random copolymerization of approximately one part styrene with three parts butadiene. These materials are thermosetting and once vulcanized, have rubbery properties. Suitable examples commercially available abound, with particularly useful materials being Stereon 700 and Stereon 720 comprising 20 percent and 10 percent styrene, respectively. These SBRs are available from Firestone Synthetic Rubber and Latex Company. Stereon is a registered trademark of The Firestone Tire & Rubber Company.

Thermoplastic elastomers or TPEs are a thermoplastic class of compounds that also have rubbery properties. What is particularly significant about them is that they possess the properties of rubber, natural or synthetic without any vulcanization. Moreover, being thermoplastic they are readily reprocessable merely by melting; an important characteristic further distinguishing them from SBR and other thermosetting rubbers. One particularly useful composition involves a block copolymer comprising polystyrene-polybutadiene-polystyrene or S-B-S polymer, and one of two commercially available classes is Kraton. Unlike natural or synthetic rubber, e.g., SBR, which obtain their rubbery properties as a result of long polymer chains being joined by irreversible chemical crosslinks during vulcanization, the unique properties of the TPEs are attributed to their linear plastic-elastomer-plastic structure. This structure is so unique that an elastomer-plastic-elastomer compound comprising the same materials requires vulcanization for full development of properties.

The addition of the non-cold flowing rubber is to accommodate two purposes. One purpose is the elimination of cold flow of the resulting thermosetting resin, particularly in pelletized form. The second purpose is to permit higher nylon content or other B components of the block copolymer to be obtained without loss of suspension during preparation.

More specifically, using the Maran resins as exemplary, a high nylon content, on the order of greater than about 65 percent by weight of the overall composition, is desirable for useful properties. Assuming the amount of non-cold polymer comprises about 20 percent by weight of the composition, then the Maran resin by itself must comprise about 80 percent nylon content. However, it is extremely difficult to prepare such a resin because as the feed of caprolactam is increased, so does the likelihood that the suspension may be lost. If this occurs, the nylon polymer quickly coats the interior of the polymerization vessel which requires shut-down of the process, cleaning of the vessel and the loss of resin product.

However, by the addition of the solution of non-cold flowing polymer, according to the process of the present invention, the suspension is more readily maintained during the addition of the caprolactam monomer. The resulting product, which may have a nylon content of at least 60 percent by weight, is not only obtained more readily, but also, it is not necessary to prepare an 80 percent nylon Maran resin first, which is then blended with the non-cold flowing polymer, in order to obtain a non-cold flowing resin product.

Because as little as five percent by weight of the non-cold flowing rubber may be adequate to impart the necessary properties to the cold flowing block copolymer, it is possible to prepare Maran resins having much higher contents of nylon block, on the order of about 85 percent or more. However, even at low amounts of non-cold flowing polymer, the suspension can be controlled, allowing the polymerization of the block copolymer to proceed. Of course, the addition of the non-cold flowing polymer is equally applicable in the preparation of cold flowing copolymers other than the Maran resins. For instance, where the tacky, cold flowing polymer is a conjugated diene homopolymer, rather than a block copolymer, the non-cold flowing rubber is added during polymerization of the diene monomer.

Thus, simultaneously with the addition of the caprolactam or other B component monomer, the process calls for the addition of the solution of non-cold flowing rubber. The non-cold flowing polymer can comprise from about 5 to 45 percent by weight of the resin product, with the cold flowing block copolymer comprising from about 55 to 75 percent by weight of the resin to form 100 total parts.

Polymerization of the second or B forming component monomer is conducted at a temperature of about 120° to 200° C. After polymerization is complete, 0.1 to 16 hours, with 3 hours being preferred, the solvent is removed such as by evaporation and the product is vacuum dried. The product is then milled into a sheet and, if desired, fillers, resins, vulcanizing agents and other additives incorporated at this point. Suitable fillers include silica, mica, $CaCO_3$, $CaSiO_3$, glass fibers, graphite fibers and the like which can be added in amounts of from about five to about 350 phr.

Peroxide vulcanizing agents such as dicumyl peroxide (Dicup), Vulcup and others disclosed in U.S. Pat. No. 3,835,075, the subject matter of which is incorporated by reference, can be employed in amounts of from about 0.5 to about 10 phr. Cure conditions are fairly standard and include cure temperatures ranging between about 150° to 180° C. and cure times of about 150 minutes down to about five minutes or less, depending upon the temperature. Inasmuch as cure conditions are conventional, they should not constitute any limitation as to practice of the present invention. Additional ingredients that can be added include compounds such as colorants, lubricants, mold release agents and coupling agents.

The product, with or without additives, is then cut into small particles such as pellets. The pellet size has not been found to be critical and the diameter is therefore discretionary. Common pellet sizes that can be employed have ranges from about 0.635 cm to 1.27 cm in diameter although larger or smaller diameters are equally applicable. As is known to those skilled in the art, pelletization, per se, is not novel. The step is required herein inasmuch as a pellet form of particle is ultimately desired.

The resulting pellets must be further treated shortly after their formation to avoid agglomeration. Although preparing with the cold flowing polymer in the presence of the non-cold flowing polymers eliminates cold flow, the problem of surface tack, stickiness, is not eliminated. The process of the present invention therefore also includes a step to remedy the sticky surface of the pellets so they will not agglomerate or fuse together.

In this next step, the particles or pellets are subjected to a surface treatment, namely addition to an aqueous solution which can react chemically therewith. Typical chemical reactions include oxidation, halogenation, hydroxylation and the like. Suitable treatment agents would include aqueous solutions of $Br_2$, $Cl_2$, NaOCl, KOCl, $Ca(OCl)_2$, $KMnO_4$, $K_2Cr_2O_7$, $H_2O_2$, $OsO_4$ and the like. While several of these can be employed alone, hydrochloric acid can be added to the sodium, potassium and calcium salts to speed the treatment. Where the cold flowing polymer comprises polybutadiene homopolymer or copolymer it is believed that the chemical treatment adds to the surface unsaturation imparted by the polybutadiene portion of the blend.

The step can be practiced by immersing previously formed pellets in one of the aqueous solutions set forth hereinabove and stirring for about 0.5 to about 30 minutes, depending upon the concentration employed, at a temperature of 25° C. The treated pellets are then filtered from the aqueous solution and washed with water to remove any residue solution. After sufficient washing, the pellets are then air dried. The resulting pellets are then also tack free.

An alternative surface treatment would include dusting or coating the pellets with a layer of a powdery filler material such as talc, mica, silica, polyethylene or the like. Where the presence of a filler material in the final product would not be undesirable from consideration of physical properties or appearance, the dusting step can be employed. If, on the other hand, no filler should be present, the first treatment with an aqueous solution as disclosed hereinabove should be employed.

The pellets prepared by this process can be stored without coalescing for extended periods of time. Testing showed that pellets comprising about 83 weight percent Maran and 17 weight percent of non-cold flowing high molecular weight high vinyl polybutadiene exhibited no tack or cold flow. Furthermore, the free flowing pellets were cured and found to possess the same physical properties as an untreated Maran resin of the same nylon content.

If the resin is unfilled, the flexural modulus of the cured resin can range from about 1.7 GPa to about 4.4 GPa depending largely upon the composition of the resin and in particular the content of nylon or other B component polymers. If, on the other hand, a filler is desired, the flexural modulus of the cured resin can range from about 3 GPa up to about 10 GPa, depending upon the filler added and amounts thereof. Addition of glass or graphite fibers as fillers will provide the upper values.

In the experimental work set forth hereinbelow, exemplifying the processes of the present invention, several Maran resins were prepared in the presence of various non-cold flowing rubbers and then surface treated. Tests were conducted and have been reported providing free-flowing properties for all the thermosetting resins including flexural and impact properties and heat distortion temperatures. A separate example involving the use of tacky, cold flowing diene homopolymer prepared in the presence of a non-cold flowing rubber was also prepared and summarized hereinbelow.

For Examples 1 and 2 which follow, a branched 1,2-polybutadiene non-cold flowing rubber (branched 1,2-PBd) was dissolved in 400 cc of dry toluene. Toluene was selected to keep the pressure down. Hexane would give higher pressures but similar reaction times in a suitable reaction vessel. The branched 1,2-PBd was characterized by a Mooney viscosity at 100° C. of 54.6; 3.7% cis-structure; 1.6% trans-structure; 94.7% 1,2-structure; 419,000 g/mole MW and average Mw/average Mn=1.114. 20 and 10 gram portions were employed for Examples 1 and 2 respectively.

EXAMPLE 1

Into a 840 ml beverage bottle with magnetic stirrer was charged a 24% solution of 1,3-butadiene (20.0 g Bd) in hexane (83.3 g). 211 g of dry hexane was also charged plus 1.20 cc of 6.6 molar TMEDA. The solution was cooled to −23° C., 2.55 cc of 1.53 molar n-butyl lithium initiator was charged and polymerization was allowed to proceed for 3 hours. At the end of this time, 0.57 cc of 7.03 molar TDI was added to the reaction vessel, followed by 80 g of dry caprolactam, 20 g of the aforementioned branched 1,2-PBd in toluene and 4.0 cc of 10% PBNA in toluene. Polymerization was allowed to proceed for 3 hours at 160° C.

EXAMPLE 2

Into a 840 ml beverage bottle with magnetic stirrer was charged a 24% solution of 1,3-butadiene (20.0 g Bd) in hexane (83.3 g). 249 g of dry hexane was also charged plus 1.20 cc of 6.6 molar TMEDA. The solution was cooled to −23° C., 2.55 cc of 1.53 molar n-butyl lithium initiator was charged and polymerization was allowed to proceed for 3 hours. At the end of this time, 0.57 cc of 7.03 molar TDI was added to the reaction vessel, followed by 80 g of dry caprolactam, 10 g of the aforementioned branched 1,2-PBd in toluene and 3.0 cc of 10% PBNA in toluene. Polymerization was allowed to proceed for 3 hours at 160° C.

Following polymerization, Examples 1 and 2 were cooled and the toluene was evaporated under a hood. Following vacuum drying, the thermoset product was milled into a sheet and cut into pellets. The pellets were then treated with a sodium hypochlorite/dilute HCl mixture for 20 minutes at 25° C. After air drying, free flowing, tack free pellets resulted.

The nylon content of Example 1 was 66.7 weight percent while that of Example 2 was 72.7 weight percent. Both contained 16.7 weight percent branched 1,2-PBd, the remaining amount being the 1,2-polybutadiene content of the Maran block copolymers.

For Examples 3 and 4 which follow, another branched, 1,2-polybutadiene non-cold flowing rubber (branched 1,2-PBd) was employed, dissolved in dry toluene. It was prepared as follows:

Preparation of High Molecular Weight 1,2-Polybutadiene

Into a clean, dry, stirred reactor was added 4545 g of a 24.5% blend of butadiene in hexane. After cooling to about 4° C., 2.8 cc of 4.66 molar of dipiperidinoethane and 4.0 cc of a 1.53 molar solution of n-butyl lithium in hexane was charged. The reaction was stirred for 16 hours and then 8.0 cc of a 1 molar solution of dry caprolactam in toluene was added to neutralize the carbon bound lithium at the end of the polybutadiene. The resulting product was a non-cold flowing rubber which comprised 23.4 weight percent solids and had a 1,2 content of 98 weight percent and an intrinsic viscosity of 1.42 dl/g as measured at 25° C. in toluene. Storage under a slight nitrogen pressure permitted use of the rubber directly without further treatment in the subsequent reactions.

EXAMPLE 3

Into a clean, dry, stirred reactor was added 1143.1 g of a 24.5% blend of butadiene in hexane. After cooling to −20° to −30° C., 17.1 cc of 6.6 molar TMEDA and 38.7 cc of a 1.53 molar solution of n-butyl lithium in hexane were added. The temperature was held at −25° C. for 3 hours and then was allowed to raise as 8.0 cc of 7.03 molar TDI was rapidly added. The temperature was then increased to 70° to 80° C. while 846.3 g of dry caprolactam was added followed by 598.7 g of the polybutadiene rubber/hexane solution described hereinabove. Heating for 3 hours at 155° to 160° C. completed the polymerization. After cooling, the suspension was drum dried to give 1252 g of a non-cold flowing sticky polymer with an intrinsic viscosity of 3.34 dl/g as measured at 25° C. in a solution of 50/50 phenol/tetrachloroethane.

The Maran resin prepared in this example had a composition of 75 weight percent nylon and 25 weight percent of 5,000 MW 1,2-PBd-NCO. When formed in the presence of the rubber described hereinabove, it had an average composition of 67 weight percent nylon-6 with 22 weight percent 1,2-PBd and 11 weight percent branched 1,2-PBd.

EXAMPLE 4

Into a clean, dry stirred reactor was added 861.8 g of a 24.5% blend of butadiene in hexane. After cooling to −20° to −30° C. 12.8 cc of 6.6 molar TMEDA and 29.0 cc of a 1.53 molar solution of n-butyl lithium in hexane were added. The temperature was held at −15° C. for 3 hours and then was allowed to rise as 6.0 cc of 7.03 molar TDI was rapidly added. The temperature was then increased to 70° to 80° C. while 854.7 g of dry caprolactam was add;d followed by 907.2 g of the polybutadiene rubber/hexane solution described hereinabove. Heating for 3 hours at 155° to 160° C. completed the polymerization. After cooling the suspension was drum dried to give 1245 g of a non-cold flowing sticky polymer with an intrinsic viscosity of 2.27 dl/g as measured at 25° C. in a solution of 50/50 phenol/tetrachloroethane.

The Maran resin prepared in the example had a composition of 75 weight percent nylon and 25 weight percent of 5,000 MW 1,2-PBd-NCO. When formed in the presence of the rubber described hereinabove, it had an average composition of 67 weight percent nylon-6 with 16.5 weight percent 1,2-PBd and 16.5 weight percent branched 1,2-PBd.

The composition obtained from Examples 3 and 4 could be milled at 40° to 80° C. to incorporate 2 parts per hundred resin of Vulcup-R as a curative. After cutting into pellets, aqueous hypochlorous acid treatment at 25° C. for 20 minutes gave tack free that pellets that could be stored for over six months and still remain free flowing.

Curing at 175° C. for 20 minutes in a compression mold gave the following properties for the unfilled resin (Example 3) as well as Examples 3 and 4 containing 150 parts of 325 mesh Silica with 1.5 parts of vinyl triacetoxysilane added as a binding agent.

TABLE I

| Physical Properties of Free Flowing Thermosetting Resins | | | |
|---|---|---|---|
| Example | 3 | 3 | 4 |
| Filler | No | Yes | Yes |
| Flexural Strength MPa | 75.21 | 79.35 | 87.63 |
| Flexural Modulus GPa | 2.35 | 4.00 | 4.42 |
| Notched Izod kJ/m | 0.050 | 0.03 | 0.022 |
| Heat Distortion Temperature °C. | 181 | 193 | 214 |
| Rockwell E hardness | 39 | 44 | 57 |

The physical properties of the cured thermosetting resins were all acceptable and generally not less than those which would characterize the same Maran resin composition without treatment according to the process of the present invention.

With respect to the free flow of Examples 1–4, after standing in the test tubes under their own weight for six months, all of the above examples would flow when the tubes were inverted, thus indicating that the process of the present invention is operable.

EXAMPLES 5–17

In the next 13 examples, 12 blends of Maran resin, as described hereinabove, with several different non-cold flowing rubbers were prepared as set forth in Table II. Example No. 17 serves as a control, comprising 100 weight percent Maran with no non-cold flowing rubber. Following polymerization and blending (except Example No. 17) each material was dried and then 2 parts by weight of Vulcup R, a peroxide curative, was milled therewith.

TABLE II

| Blends of Maran Resin With Non-Cold Flowing Rubbers | | | |
|---|---|---|---|
| Example No. | Maran wt % | Rubber | Preparation |
| 5 | 70 | PBd[a] | solution |
| 6 | 80 | PBd[a] | solution |
| 7 | 90 | PBd[a] | solution |
| 8 | 80 | Norsorex | solution |
| 9 | 90 | Norsorex | solution |
| 10 | 80 | Nordel | solution |
| 11 | 90 | Nordel | solution |
| 12 | 80 | Polypentamer | solution |
| 13 | 90 | Polypentamer | solution |
| 14 | 70 | Norsorex | mill |
| 15 | 80 | Norsorex | mill |
| 16 | 90 | Norsorex | mill |
| 17 | 100 | — | — |

[a]polybutadiene

Examples 5–13 were prepared in solution, according to the process of the present invention, while Examples 14–16 were mill blended. Non-cold flowing polymers employed included the non-cold flowing high molecular weight 1,2 polybutadiene disclosed hereinabove; Norsorex, a polynorbornene; Nordel, an EPDM rubber; and, polypentamer, all of which were disclosed hereinabove.

Each material of Examples 5–17 was cured at 157° C. for two hours and then physical properties were measured. Results have been summarized in Table III.

TABLE III

| Physical Properties of Examples No. 5–17 | | | | | | | |
|---|---|---|---|---|---|---|---|
| Example No. | Flexural Strength Mpa | Flexural Modulus GPa | Notched Izod kJ/m | Unnotched Izod kJ/m | HDT °C. | Hardness Rockwell E | Gardner Impact J |
| 5 | 42.92 | 3.59 | 0.0064 | 0.118 | 192 | 89 | 0.26 |
| 6 | 66.17 | 3.77 | 0.0187 | 0.170 | 191 | 82 | 0.29 |
| 7 | 70.45 | 4.16 | 0.0139 | 0.127 | 191 | 82 | 0.41 |

TABLE III-continued

Physical Properties of Examples No. 5-17

| Example No. | Flexural Strength Mpa | Flexural Modulus GPa | Notched Izod kJ/m | Unnotched Izod kJ/m | HDT °C. | Hardness Rockwell E | Gardner Impact J |
| --- | --- | --- | --- | --- | --- | --- | --- |
| 8 | 70.79 | 4.36 | 0.0523 | 0.768 | 54 | 44 | 1.13 |
| 9 | 61.27 | 3.60 | 0.0363 | 0.460 | 76 | 67 | 0.79 |
| 10 | 34.09 | 1.85 | 0.0187 | 0.223 | 72 | 47 | 0.60 |
| 11 | 58.31 | 2.95 | 0.0171 | 0.217 | 179 | 61 | 0.41 |
| 12 | 70.86 | 3.39 | 0.0309 | 0.465 | 65 | 70 | 0.75 |
| 13 | 71.90 | 3.47 | 0.0246 | 0.393 | 168 | 74 | 0.57 |
| 14 | 59.41 | 2.96 | 0.0347 | 0.399 | 50.5 | 41 | 0.71 |
| 15 | 62.93 | 2.95 | 0.0261 | 0.296 | 57 | 49 | 0.75 |
| 16 | 64.72 | 2.49 | 0.0352 | 0.446 | 87.5 | 64 | 0.63 |
| 17 | 63.34 | 2.77 | 0.0235 | 0.268 | 175.3 | 74 | 0.71 |

As is evident from the data in Table III, the blends of Maran resin and non-cold flowing rubbers had a flexural modulus of a least 1.7 and many exhibited higher values than Maran, unblended with a non-cold flowing rubber.

The Maran products of Examples 5-7 and 9-16 were next oxidized in aqueous solutions by the following procedure in order to reduce surface tack, according to the process of the present invention. Approximately 18 grams of each blend was cut into 0.6 cm diameter pellets and stirred into 120 to 150 cc of the chemical indicated in Table IV for 35 minutes at 25° C. The chemicals included sodium, and calcium hypochlorite and 3N hydrochloric acid. After oxidation was complete, the pellets were isolated by filtration, washed in water and air dried. Tack was observed by storing the pellets in test tubes 25×200 mm (⅔ to ¾ full) and inverting after at least one day to determine if the pellets were free flowing. Results are reported in Table IV.

The entire mixture was milled until it became homogeneous. A tough, rubbery mass obtained which was then rolled into a 1.27 cm diameter roll and cut into 1.27 cm pellets. The pellets were treated 120 cc of CLOROX ® (0.65 m) and 12 cc of concentrated hydrochloric acid (NaOCl/HCl=78 mM/144 mM). The mixture was stirred for 30 minutes at 25° C., filtered, washed and dried. The pellets were then stored in a test tube at room temperature for one week and exhibited no sticking upon inversion. Molding was conducted at 175° C. for 20 minutes and provided the following properties:

| | |
| --- | --- |
| Flexural strength | 49.83 MPa |
| Flexural modulus | 8.357 GPa |
| Maximum elongation | 0.65 |
| Energy at break | 167.31 MJ/m$^3$ |
| Plasticity at 100° C. | 33.2 cm$^2$ |

Based upon the results reported herein, it should be

TABLE IV

Tack Properties of Maran Blends

| Example No. | Hypochlorite Metal (mE) | 3N HCl cc (mM) | Rubber % type | Tack, Free Flow |
| --- | --- | --- | --- | --- |
| 5 | Na (84) | 8 (24) | 30 1,2 PBd | None, yes |
| 6 | Na (84) | 8 (24) | 20 1,2 PBd | Slight, but some flow |
| 7 | Na (84) | 24 (72) | 10 1,2 PBd | Yes, no flow |
| 9 | Na (84) | 16 (48) | 10 Norsorex | Slight sticking, good flow |
| 10 | Ca (84) | 8 (24) | 20 Nordel | Slight, some flow |
| 11 | Na (84) | 8 (24) | 10 Nordel | Slight, some flow |
| 12 | Na (84) | 14 (42) | 20 Polypentamer | Slight, some flow |
| 13 | Ca (24) | 8 (24) | 10 Polypentamer | Slight, some flow |
| 14 | Ca (12) | 4 (12) | 30 Norsorex$^a$ | None, yes |
| 15 | Ca (24) | 8 (24) | 20 Norsorex$^a$ | None, yes |
| 16 | Na (84) | 8 (24) | 10 Norsorex$^a$ | Very slight, good flow |

$^a$milled

EXAMPLE 18

Finally, another cold flowing rubber was evaluated, in lieu of the Maran resin. The rubber comprised a polybutadiene homopolymer, Dienite PD702, having a very low molecular weight (13,400 grams/mole) and a high vinyl content (about 95 percent). A blend was prepared in an unheated Brabender Plasticorder of the following components 4.0 g of high molecular weight, high vinyl polybutadiene
16.0 g of Dienite PD702
70.0 of Silica (325 mesh)
1.2 g of Dicup R After mixing for five minutes, the mixture was removed and then milled on an unheated electric mill with the addition of 6.0 g of Silica (325 mesh)
0.38 cc of vinyl triacetoxysilane apparent that the process of the present invention can be employed to provide novel free flowing pellets of thermosetting resins. The polymers prepared essentially retain their useful physical properties while undesirable cold flow and tack are virtually eliminated.

Moreover, as noted hereinabove, in the process of preparing Maran resins according to the aforementioned patents of the Assignee of record, the nylon content of the block copolymer Maran, can range from about 25 to 80 percent by weight depending upon the amount of caprolactam charged. However, at the higher nylon contents, e.g., over 70 percent, often a loss of suspension results with a corresponding decrease in conversion to as low as 40 percent. By adding the solution of non-cold flowing rubber according to the process set forth herein, a higher viscosity reaction mixture is produced which allows the incorporation of higher nylon contents without loss of suspension.

It is to be understood that the various examples reported herein have been provided to present results obtainable by practice of the disclosed invention. Inasmuch as various polymers, as well as substances for the surface treatment step, that can be employed to practice the process of the present invention have been disclosed, the invention is not to be limited by the examples provided herein. It will be understood, therefore, that other polymers and surface treatment agents or methods of treatment can be substituted for those that have been exemplified. Regarding the selection of fillers, curatives and other additives and the like, the present invention should not be restricted to less than the total group of such compounds which are known for the preparation of thermosetting resins inasmuch as they are only optionally and do not constitute the point of novelty.

Thus, it can be seen that the disclosed invention carries out the various objects of the invention. It is also to be understood that the amounts of particular polymers to be employed can be determined without departing from the spirit of the invention herein disclosed and described, and that the scope of the invention shall include all modifications and variations that fall within the scope of the attached claims.

I claim:

1. A process for preparing free flowing pellets of thermosetting resin comprising the steps of:
    polymerizing in the presence of a polymerization solvent the A forming component of a peroxide curable, tacky, cold flowing block copolymer AB, selected from the group consisting of conjugated dienes and mixtures thereof with monomers selected from the group consisting of vinyl substituted aromatic monomers, aliphatic, aromatic and cycloaliphatic oxide and sulfide monomers, to form an active block;
    end capping said active block with a polyisocyanate compound;
    forming a solution of a non-cold flowing rubber selected from the group consisting of ethylene-propylene-hexadiene copolymers, natural rubber, styrene-butadiene rubber, other than thermoplastic elastomers of styrene and conjugated dienes butyl rubber, branched high molecular weight high vinyl butadiene rubber, polynorbornene, polypentamer and thermoplastic elastomers of styrene and conjugated dienes;
    charging said solution simultaneously with the addition of the B forming component of said block copolymer AB with heat to form a thermosetting resin, said B component being selected from the group consisting of polyamides, polyimides, polyureas, polyurethanes, polyureaurethanes and polyphenolformaldehydes;
    removing the polymerization solvent;
    forming pellets of said resin, free from cold flow;
    subjecting said pellets to a surface treatment whereby a coating is provided to remove tack; and
    thereafter separating sid pellets to yield a free flowing thermosetting resin comprising from about 55 to 95 parts by weight of said tacky, cold flowing block copolymer and from about 5 to 45 parts by weight of said non-cold flowing rubber and which upon cure has a flexural modulus of from about 1.7 GPa to about 4.4 GPa.

2. A process, as set forth in claim 1, wherein said tacky, cold flowing block copolymer comprises poly(-butadiene-block-nylon-6) and said non-cold flowing rubber is a branched high vinyl, high molecular weight 1,2-polybutadiene.

3. A process, as set forth in claim 2, wherein said step of polymerizing includes the steps of:
    anionically polymerizing 1,3-butadiene to form an active polybutadiene block.

4. A process, as set forth in claim 3, wherein said active polybutadiene block comprises polybutadienyl lithium; and
    said polyisocyanate compound is selected from the group consisting of di- and triisocyanates and di- and triisothiocyanates.

5. A process, as set forth in claim 4, wherein said diisocyanate is toluene diisocyanate.

6. A process, as set forth in claim 1, wherein said step of subjecting said pellets comprises oxidation with an aqueous solution.

7. A process for preparing free flowing pellets of thermosetting resin comprising the steps of:
    polymerizing in the presence of a polymerization solvent the A forming component of a peroxide curable, tacky, cold flowing block copolymer AB, selected from the group consisting of conjugated dienes and mixtures thereof with monomers selected from the group consisting of vinyl substituted aromatic monomers, aliphatic, aromatic and cycloaliphatic oxide and sulfide monomers, to form an active block;
    end capping said active block with a polyisocyanate compound;
    forming a solution of a non-cold flowing rubber selected from the group consisting of ethylene-propylene-hexadiene copolymers, natural rubber, styrene-butadiene rubber, butyl rubber, branched high molecular weight high vinyl butadiene rubber, polynorbornene, polypentamer and thermoplastic elastomers of styrene and conjugated dienes;
    charging said solution simultaneously with the addition of the B forming component of said block copolymer AB with heat to form a thermosetting resin, said B component being selected from the group consisting of polyamides, polyimides, polyureas, polyurethanes, polyureaurethanes and polyphenolformaldehydes;
    removing the polymerization solvent;
    adding suitable fillers to said resin in an amount of from about five to about 350 parts per 100 parts of said resin;
    forming pellets of said resin, free from cold flow;
    subjecting said pellets to a surface treatment whereby a coating is provided to remove tack; and
    thereafter separating said pellets to yield a free flowing thermosetting resin comprising from about 55 to 95 parts by weight of said tacky, cold flowing block copolymer and from about 5 to 45 parts by weight of said non-cold flowing rubber and which upon cure has a flexural modulus of from about 3 GPa to about 10 GPa.

8. A process, as set forth in claim 7, wherein said tacky, cold flowing block copolymer comprises poly(-butadiene-block-nylon-6) and said non-cold flowing rubber is a branched high vinyl, high molecular weight 1,2-polybutadiene.

9. A process, as set forth in claim 8, wherein said step of polymerizing includes the steps of:
    anionically polymerizing 1,3-butadiene to form an active polybutadiene block.

10. A process, as set forth in claim 9, wherein said active polybutadiene block comprises polybutadienyl lithium; and
said polyisocyanate compound is selected from the group consisting of di- and triisocyanates and di- and triisothiocyanates.

11. A process, as set forth in claim 10, wherein said diisocyanate is toluene diisocyanate.

12. A process, as set forth in claim 7, wherein said step of subjecting said pellets comprises oxidation with an aqueous solution.

* * * * *